Feb. 2, 1971 — R. L. COLLINS — 3,559,457
HYDROGEN DETECTOR
Filed Nov. 20, 1969

INVENTOR:
RALPH L. COLLINS,
BY Parry A. Stein
ATTORNEY

United States Patent Office 3,559,457
Patented Feb. 2, 1971

3,559,457
HYDROGEN DETECTOR
Ralph L. Collins, Rome, Ga., assignor to General
Electric Company, a corporation of New York
Filed Nov. 20, 1969, Ser. No. 878,290
Int. Cl. G01n 31/06
U.S. Cl. 73—23
11 Claims

ABSTRACT OF THE DISCLOSURE

A transformer tank hydrogen detector comprises an instrument housing mounted to form a wall portion of the tank. Disposed inside the housing and communicating with an aperture therein is a tubular detecting element having a surface communicating with the interior of the tank. The tubular detecting element is formed of a palladium alloy which will expand in the presence of hydrogen. Indicator means are connected to the tube and display the amount of its axial expansion. Valve means are utilized to introduce a standard gas into the housing for calibration purposes. Alarm means and temperature regulating means may also be utilized.

---

This invention relates generally to apparatus for detecting the presence of hydrogen gas and concerns particularly apparatus for detecting the presence of hydrogen gas in oil-filled transformer tanks.

Transformers are commonly constructed utilizing an oil-filled tank which serves to house the transformer core and windings. During transformer operation certain malfunctions such as core hot spots, winding hot spots, arcing and corona may cause the decomposition of the oil hydrocarbons and the solid hydrocarbon insulation thereby liberating free hydrogen which may collect in the transformer tank.

Since the presence of hydrogen in a transformer tank is indicative of an existing transformer malfunction, it is important to detect its presence quickly and accurately in order that corrective measures can be taken to arrest the malfunction in its incipiency at which time repairs can be most expeditiously made.

Further, the presence of hydrogen in the confined area of a transformer tank presents an explosion hazard which must be nullified quickly. Accordingly, the detection of hydrogen serves a secondary function in warning of the presence of hydrogen such that corrective measures can be taken to prevent an explosion.

Electronic devices have been constructed to detect the presence of hydrogen in a test sample. However, such devices are necessarily complex and may even present an explosion hazard themselves since they operate by passing current through a monitored glowing wire filament while subjecting the filament to the sampled gas. If hydrogen is present in the sample the resistance of the filament will necessarily increase due to the surface contamination caused by the hydrogen. Any increase in resistance is monitored by electronic circuitry to indicate such an increase and thereby provide an indication of the concentration of hydrogen in the sample.

In U.S. patent application Ser. No. 797,935, filed Feb. 10, 1969 by P. J. Shaver and assigned to the same assignee as the present application, there is described a mechanical hydrogen analyzer which is simple in construction and which presents no explosion hazard. That analyzer operates upon the principle that a palladium alloy will expand in the presence of hydrogen. As therein disclosed, a bimetal strip having a palladium alloy for one element is so constructed that in the presence of hydrogen the strip will deflect a measurable amount proportional to the amount of hydrogen present in a gas sample.

A significant feature of the foregoing bimetallic analyzer is that it is particularly suited for use in situations where hydrogen concentration changes rapidly. Accordingly, the bimetal strip is necessarily made thin in order to be quick acting. The consequence of such a construction is that very little deflection force is available to drive a mechanical indicator. This may necessitate the use of a very sensitive mechanical indicator in applications where a mechanical indicator is desirable.

Owing to the fact that the palladium alloys disclosed in the above-mentioned application have the property of increasing in hydrogen absorption ability with decreasing temperatures a bimetal strip constructed of such alloys may deflect to an injurious degree when operating at low ambient temperatures in the presence of a high concentration of hydrogen. Further, the thin construction of the strip renders it susceptible to damage as a result of mechanical shock.

Accordingly, it is an object of this invention to provide a rugged hydrogen detector utilizing a palladium alloy detecting element which is capable of driving either a mechanical or electrical indicator and which can be safely operated at low ambient temperatures.

During operation in a transformer tank it is preferable to utilize the hydrogen detector to monitor constantly the prevailing hydrogen concentration since the amount of hydrogen liberated during a given period of time will vary depending on internal conditions in the transformer tank. Therefore, it is important to maintain the operating integrity of the detector at its initially calibrated value, in which case recalibration may be required from time to time. In that regard the detector should be capable of recalibration without necessitating its removal from the transformer tank, which removal would result in costly transformer operating delays.

Therefore, it is a further object of this invention to provide a hydrogen detector which is simple in construction and particularly suited for calibration without requiring its removal from the transformer tanks.

SUMMARY OF THE INVENTION

In carrying out my invention in one preferred embodiment, I provide an instrument housing having an apertured wall portion and a tubular gas detecting element mounted within the housing and over the aperture. The tubular element is closed at one end only and its open end is sealed to the housing around the wall aperture, thereby to cap the aperture but admit the ambient atmosphere outside the housing into the interior of the tubular element. The tubular element is formed of a material which expands in the presence of a gas to be detected in the ambient atmosphere. For detection of hydrogen such a material is preferably an alloy of palladium and one or more of the metals in the class consisting of silver, gold, copper, rhodium, ruthenium, molybdenum, niobium and chromium. Suitable indicating means proportionably responsive to change in axial length of the tubular element is mounted within the instrument housing. To use such instrument for detection of hydrogen in a transformer tank the instrument housing is mounted as a cover or cap over an opening in the tank wall so that the apertured wall portion of the housing constitutes a portion of the tank wall.

To facilitate calibration of my improved gas detector I provide a sealed cover over the instrument housing and means for admitting a measured amount of gas into the housing and around the outer surface of the tubular detecting element. In such calibration the inside of the tubular element should be purged of gas. To this end I provide a valve or other closure to cap the open end of the tube and isolate its interior from the atmosphere outside the instrument housing.

BRIEF DESCRIPTION OF THE DRAWINGS

This invention will be better understood and its various objects and advantages will be more fully appreciated from the following description taken in conjunction with the accompanying drawings in which.

DESCRIPTION OF THE PREFERRED EMBODIMENT

Figure 1:
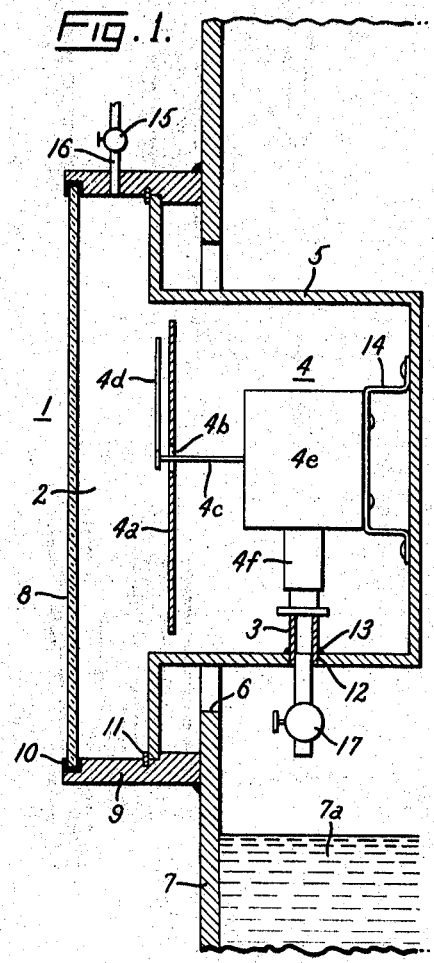
FIG. 1 is a side elevational view, in section, of a hydrogen detector constructed and mounted in a manner embodying my invention.

As shown in FIG. 1 the hydrogen detector 1 comprises an instrument housing 2 containing a tubular detecting element 3 and an indicating instrument 4. The housing 2 is formed of a cup-shaped base portion 5 mounted over an opening 6 in a wall of transformer tank 7 containing oil 7a and is sealed to the tank to form a portion of the tank wall. The cup-shaped housing base 5 extends into the tank and is closed at the front by a cover comprising a transparent glass faceplate 8 and a closure ring 9. The glass faceplate is sealed to the closure ring by a gasket 10 and the cup-shaped housing base is sealed to the closure ring by suitable means including a mounting ring 11.

Cup-shaped housing base 5 has an aperture 12 communicating with the interior of tank 7. Tubular detecting element 3 has its open end sealed to the cup-shaped base portion 5 surrounding the aperture 12 by means of a gasket or barzed joint 13. The tubular element 3 is formed of a material which expands in the presence of a gas to be detected. For detection of hydrogen such material is preferably an alloy of palladium and one or more of the metals of the group consisting of silver, gold, copper, rhodium, ruthenium, molybdenum, niobium and chromium.

Figure 1A:
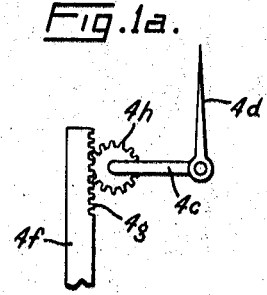
FIG. 1a is a detail view of a portion of the hydrogen detector as shown in FIGS 1, 2 and 5.

In order to measure the amount of expansion of tube 3 when exposed to hydrogen a displacement transducer is provided which, as shown in FIG. 1, comprises a dial indicator 4 having a graduated dial face 4a with a central opening 4b through which shaft 4c of dial hand 4d passes, a motion detecting mechanism 4e and an indicator arm 4f. Motion detecting mechanism 4e is so constructed that upon a linear displacement of indicator arm 4f a rotational displacement is imparted to dial hand 4d proportionl to the linear displacement of arm 4f. Such a motion-detecting mechanism, as shown in FIG. 1a, comprises a rack 4g and interacting gear 4h to which shaft 4c is coupled. Dial indicator 4 is held in place in housing 2 by means of a bracket 14.

Figure 1B:
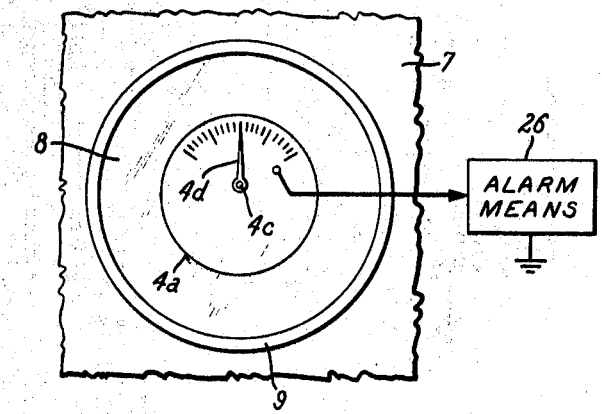
FIG. 1b is a front elevational view of the dial face of the hydrogen detector embodying features of my invention.

It can thus be appreciated that in the event that hydrogen gas enters the interior of tubular detecting element 3 this element will expand thereby causing indicator arm 4f to be longitudinally displaced thus imparting a rotational displacement of dial hand 4d through the interaction of rack 4g and gear 4h. As shown in FIG. 1b, the amount of rotational displacement indicative of the concentration of hydrogen in the interior of tubular detecting member 3 can then be read off graduated dial face 4a.

Although my device is operable without the use of faceplate cover 8, I provide this cover to create a sealed instrument housing in order to facilitate calibration. It can be seen from the particular construction of tubular detecting element 3 that two surfaces are available for sensing the presence of hydrogen. As shown in FIG. 1, the interior surface of the tubular detecting element is available to sense hydrogen present inside tank 7 whereas the outside surface of the tubular detecting element is available to sense the presence of hydrogen in the sealed instrument housing 2. I therefore make use of this latter surface to sense the presence of a known amount of hydrogen which may be introduced into the sealed housing 2 through valve means 15 and passageway 16.

As a result of this construction the hydrogen detector can be calibrated by simply introducing a known amount of hydrogen through valve 15 into the interior of housing 2 and noting the amount of deflection of the dial hand. To accurately calibrate the device it may be necessary to preclude the admission of any hydrogen existing in the transformer tank from the interior of the tubular detector during a calibration cycle. To this end I have provided means to isolate the open end of detector element 3 from the interior of the tank 7. Such means may comprise a valve 17 which is kept open during normal operation of the detector and closed during the calibration cycle.

Figure 2:
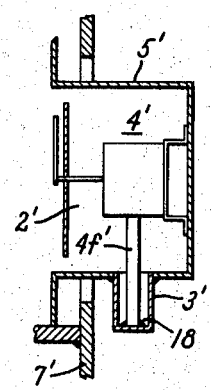
FIG. 2 is a partial side elevational view, in section, of another embodiment of my hydrogen detector.

In an alternative embodiment, as shown in FIG. 2 I provide a hydrogen detector similar to that shown in FIG. 1 except that the tubular detecting element 3' is reversed such that its interior communicates with the interior of the instrument housing 2' while its exterior communicates with the interior of the tank 7'. Such an arrangement requires that indicator arm 4f' of indicator 4' be connected, as by brazed joint 18, to the interior of tubular detector 3' such that upon expansion of the detector 3' in the presence of hydrogen the indicator 4' will be actuated.

Figure 3:
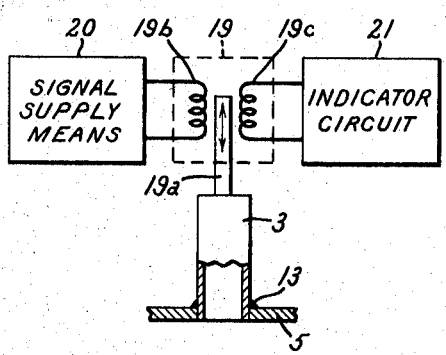
FIG. 3 is an enlarged view, partially in section, showing a portion of a modified embodiment of my invention.

As shown in FIG. 3, an electrical displacement transducer can be utilized in my hydrogen detector in lieu of the dial indicator 4. Such an electrical device comprises a linear variable displacement transformer having its armature or core 19a connected to the free end of detector element 3, a signal supply means 20 coupled to the primary 19b of the transformer and an indicating circuit 21 coupled to the secondary 19c of the transformer. In operation signal supply means 20 provides a signal to the primary of the transformer. The output signal from the secondary of the transformer is supplied to the indicator circuit to provide a reading indicative of the linear position of the core. Since the linear position of the core is controlled by the length of tubular detecting element 3 the output signal indicated by the indicator circuit provides a reading of the amount of expansion of the detecting element which is proportional to the amount of hydrogen present at a surface of the tubular detecting element.

Figure 4:
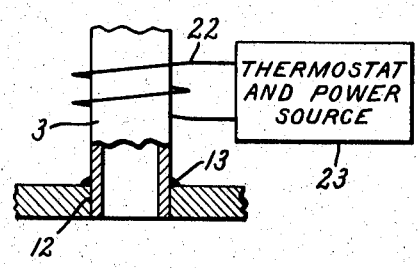
FIG. 4 is an enlarged view, partially in section, showing a portion of a modified embodiment of my invention.

Owing to the fact that the detector embodying the present invention operates on an expansion principle, variations in ambient temperature may cause unwanted thermal expansion of the palladium alloy detecting element thereby introducing some error into the reading. In order to insure the accuracy of the device, in certain applications it may be necessary to utilize a temperature regulating device to keep the detector element at a constant temperature. As shown in FIG. 4 the temperature regulator comprises a heating coil or filament 22 coupled to a thermostat and power source 23.

In another embodiment of my invention I provide a hydrogen detector which by its construction eliminates inaccuracies due to thermal expansion of the detecting element, even when operating under conditions where severe ambient temperature changes occur, thereby eliminating the necessity of a temperature regulating device.

Figure 5:
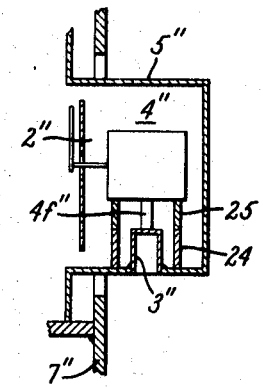
FIG. 5 is a partial side elevational view, in section, of another embodiment of my hydrogen detector.

To that end, as shown in FIG. 5, I provide a hydrogen detector similar to that shown in FIG. 1 except that the indicator 4'' is supported on members 24 and 25 in lieu of bracket 14. Member 24 is proportioned such that it is the same length as detecting element 3 and is formed of a material which is insensitive to the presence of hydrogen but which has similar coefficient of thermal expansion as detecting element 3''. Support members 25 hold the indicator 4'' on member 24 and are formed from a material which inhibits a very low coefficient of thermal expansion as compared to the detector element 3''. By utilizing this construction I am able to support the indicator a constant distance from the closed end portion of tubular detecting element regardless of temperature changes since the length of member 24 and element 3'' will be the same at any given temperature. Accordingly, indicator arm 4f will not be displaced due to temperature changes whereas it will be displaced when detector element 3'' is in the presence of hydrogen since only detector 3'' is made of a material which will expand in the presence of hydrogen.

Regardless of whether a mechanical or electrical indicator is utilized in my hydrogen detector, it may be desireable in certain cases to provide an alarm in the event of the detection of a predetermined amount of hydrogen in the tank. Accordingly, I provide such alarm means in my detector. As shown in FIG. 1b, alarm means 26 is coupled to the indicator dial face 8 although it may be coupled in any expeditious manner to the mechanical indicator 4 shown in FIG. 1 or to the indicator circuit 21 shown in FIG. 3. Alarm means 26 may provide either a visual or audible signal or both.

Although I have primarily discussed the utilization of my hydrogen detector in oil-filled transformer tanks, it should be appreciated that my detector has application wherever hydrogen detection is required, for example in underground utility vaults, sewage systems and petroleum tanks.

Accordingly, while a particular embodiment of my invention has been shown and described, it will be obvious to those skilled in the art that various changes and modifications may be made without departing from my invention in its broader aspects. I therefore intend herein to cover all such changes and modifications as fall within the true scope and spirit of my invention.

What I claim as new and desire to secure by Letters Patent of the United States is:

1. An instrument for detecting the presence of hydrogen gas within an enclosure defined by a wall having an opening therein comprising:
    (a) a housing having a portion adapted to be mounted over and to close said opening thereby to constitute a portion of said wall, said housing portion having an aperture therein,
    (b) a tubular member closed at one end and open at the other end, said tubular member being sealed to said housing portion around the periphery of said aperture thereby providing internal and external gas receiving surfaces, one of said surfaces being disposed for communicating with any gas present in the interior of said housing and the other of said surfaces being disposed for communicating with any gas present in said enclosure, said tubular member being formed of a metal alloy of palladium having the property of expanding volumetrically in the presence of the hydrogen and
    (c) indicating means coupled to said tubular member and responsive to expansion of said tubular member to indicate the presence of hydrogen gas at one of said surfaces of said tubular member.

2. The instrument as specified in claim 1 wherein said internal surface of said tubular member is disposed for communicating with any gas present inside said enclosure and said external surface of said tubular member is disposed for communicating with any gas present inside said housing.

3. The instrument as specified in claim 1 wherein said internal surface of said tubular member is disposed for communicating with any gas inside said housing and said external surface of said tubular member is disposed for communicating with any gas inside said enclosure.

4. The instrument as specified in claim 1 wherein valve means are associated with said housing for allowing the introduction of a known amount of hydrogen gas into said housing thereby allowing calibration of said indicating means.

5. The instrument as specified in claim 2 wherein valve means are associated with said housing for allowing the introduction of a known amount of hydrogen gas into said housing thereby allowing calibration of said indicating means.

6. The instrument as specified in claim 3 wherein valve means are associated with said housing for allowing the introduction of a known amount of hydrogen gas into said housing thereby allowing calibration of said indicating means.

7. The instrument as specified in claim 5 wherein means are provided to isolate the interior of said tubular member from the interior of said enclosure.

8. The instrument as specified in claim 1 wherein temperature regulating means are disposed adjacent said tubular member.

9. The instrument as specified in claim 1 wherein said indicating means is a displacement transducer comprising an arm responsive to axial displacement of said tubular member, a motion-detecting mechanism coupled to said arm and a display device driven by said motion detecting mechanism.

10. The instrument as specified in claim 1 wherein said indicator means is a displacement transducer comprising a linear variable displacement transformer coupled to said tubular member, a supply means providing a signal to said transformer and an indicator circuit driven by said transformer.

11. The device as specified in claim 1 having means for rendering the instrument insensitive to temperature changes said means comprising a support for said indicator formed of a material having a coefficient of thermal expansion so related to the coefficient of thermal expansion of said tubular member that said indicating means is not actuated upon a change in dimension of said tubular means resulting from a temperature change whereas said indicating means is actuated upon a change in dimension of said tubular member resulting from the presence of hydrogen at one of said surfaces of said tubular member.

References Cited
UNITED STATES PATENTS

| 1,467,911 | 9/1923 | Arendt | 73—26 |
| 2,293,019 | 8/1942 | Johnson | 73—23X |
| 2,307,800 | 1/1943 | Norton | 73—26 |

RICHARD C. QUEISSER, Primary Examiner

C. E. SNEE III, Assistant Examiner

U.S. Cl. X.R.

340—237; 23—255